No. 891,528. PATENTED JUNE 23, 1908.
G. DUNKEL.
MOLDING MACHINE.
APPLICATION FILED MAR. 28, 1907.

2 SHEETS—SHEET 1.

Witnesses:

Inventor:
Gottlieb Dunkel

No. 891,528. PATENTED JUNE 23, 1908.
G. DUNKEL.
MOLDING MACHINE.
APPLICATION FILED MAR. 28, 1907.
2 SHEETS—SHEET 2.
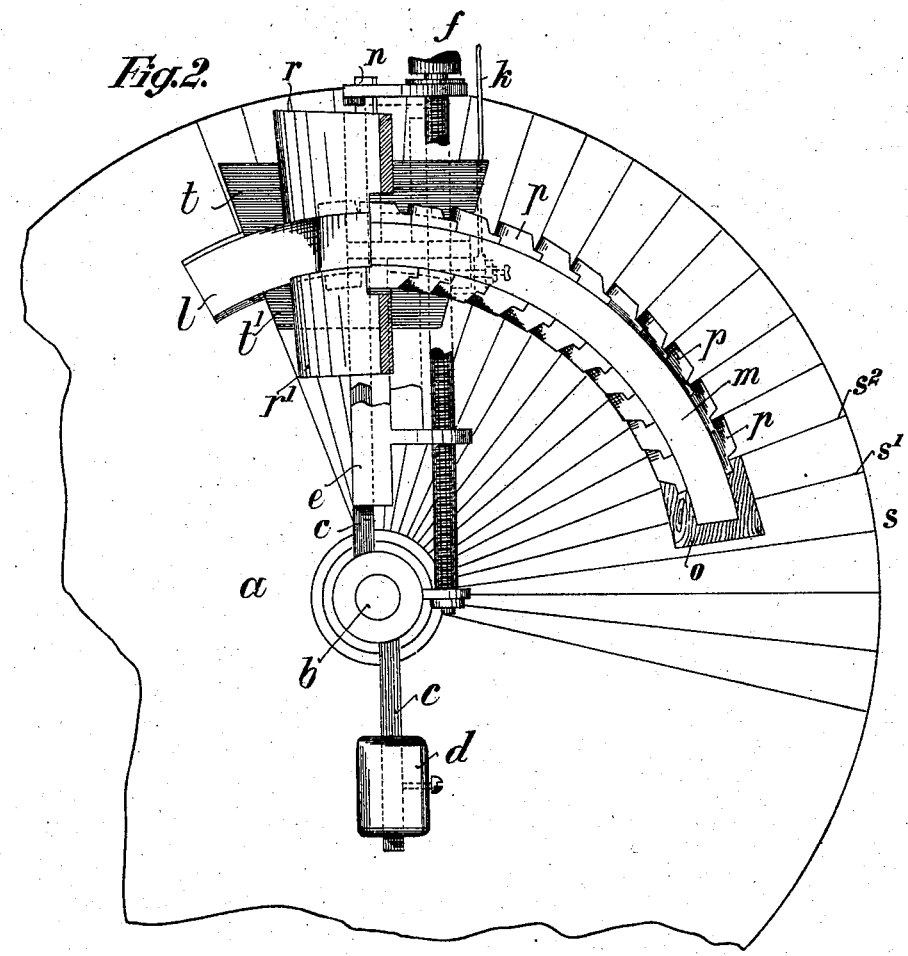
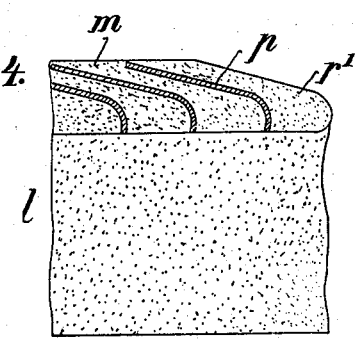
Witnesses:
Inventor:

UNITED STATES PATENT OFFICE.

GOTTLIEB DUNKEL, OF GÖRLITZ, GERMANY.

MOLDING-MACHINE.

No. 891,528.   Specification of Letters Patent.   Patented June 23, 1908.

Application filed March 28, 1907. Serial No. 365,201.

*To all whom it may concern:*

Be it known that I, GOTTLIEB DUNKEL, chief engineer, residing at No. 15 Gartenstrasse, in Görlitz, Kingdom of Prussia, German Empire, have invented certain new and useful Improvements in or Relating to Molding-Machines, of which the following is the specification.

This invention relates to a molding machine for manufacturing cores with plates, vanes, paddles and the like which have to be cast in. The manufacture of the cores is effected in such manner that they are built up of small-core pieces strongly rammed together, the plates, vanes, paddles and the like embedded in them, subsequently to be cast in, being held firmly in exact position in order to prevent the formation of burs in the casting at the joints of the plates, paddles, vanes, etc. The mold for the plates arranged between the spaced plates or the like, is formed by patterns which are adjustable in accordance with the shape of the whole core, so that the core pieces can be consecutively produced between them.

A construction of a machine embodying the invention is illustrated, by way of example, in the accompanying drawing.

Figure 1:
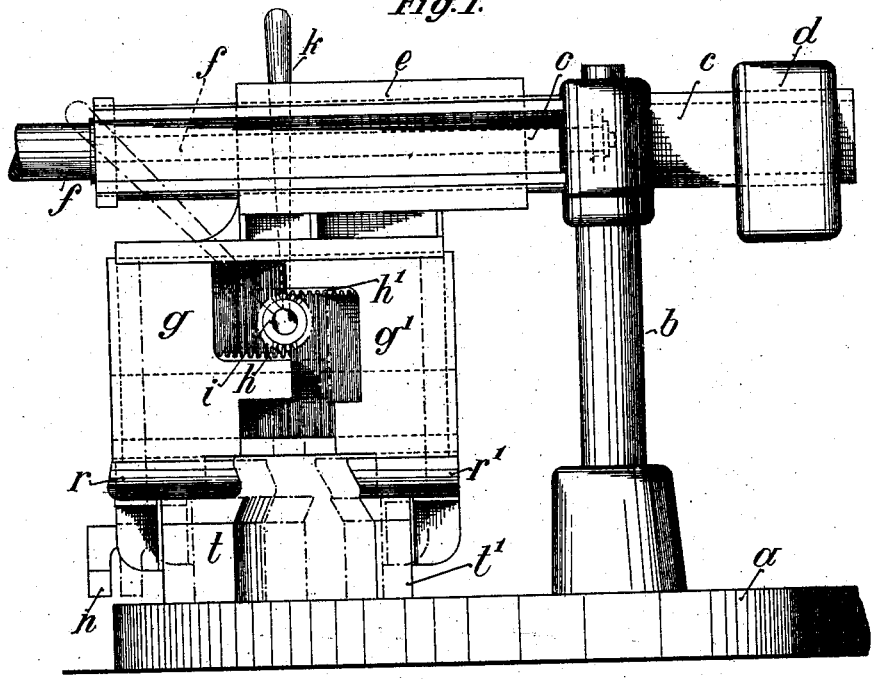
Figure 3:
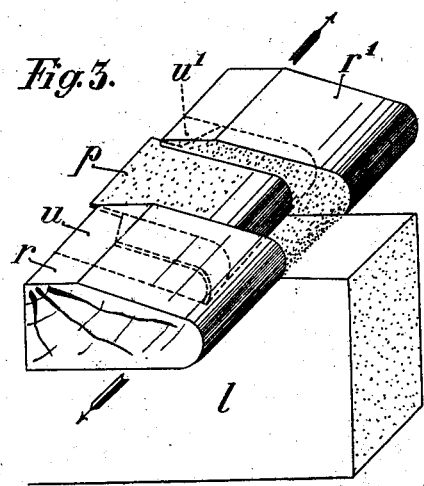

Figure 1 is a front elevation, Fig. 2 a plan partly in horizontal cross-section, Figs. 3 and 4 are detail views.

To a bottom plate $a$ of any desired size, is secured a vertical standard $b$. On the latter is revolubly mounted an arm $c$ balanced by a weight $d$. On the arm $c$ is mounted a carriage or slide $e$ which can be manually adjusted by means of a screw-threaded spindle $f$, in such manner as to be brought nearer to, or further away, from the standard $b$. This arrangement serves to adjust with precision the distance of the center of the cores to be produced, from the axis of the standard $b$. On the slide $e$ are mounted two jaws $g$ $g'$ guided in a horizontal guide and provided with toothed racks $h$ $h'$ by means of which, and of a toothed wheel $i$ engaging with them, they can be brought nearer together or further apart by means of a lever $k$. On the jaws $g$ $g'$ are carried pattern blocks or pieces $r$ $r'$ respectively, and under them, pattern pieces $t$ $t'$ of which the inner opposed faces are made as the arcs of concentric circles. The patterns $t$ $t'$ form the mold for the main core $l$, and the patterns $r$ $r'$ the mold for the core pieces $m$ (Figs. 3 and 4) which are placed between the spaced vanes $p$ and hold the latter during casting. The mold blocks $r$ $r'$ are provided with recesses $u$ $u'$ in which the vanes engage during the molding, so that they project at both sides from the rammed core, and are surrounded by the metal poured in.

The working of the molding machine is as follows:—The distance that is to be maintained between the small cores $m$, that is between the plates, vanes $p$ and the like, is marked on the plate $a$ as shown by the lines $s$ $s'$ $s^2$, Fig. 2. Then the slide $e$ is moved by means of the standard $f$ away from the spindle $b$ to the exact distance at which the line of the cores is required to be from the axis $b$. Then the jaws $g$ $g'$ are set by means of the lever $k$ at such relative distance that the pattern pieces $t$ $t'$ form a mold for the core piece $l$ to be produced, of square, rectangular or other cross-section of a definite length. The sand is then rammed in between them, and the main core $l$ thus produced. The arm $c$ is then adjusted in such manner that the index $n$ secured to the outer cheek $t$, points to the second division line $s'$, reckoning from the end of the core piece $l$. To the end of the main core $l$ a pattern piece $o$ is then secured, so that the pattern pieces $r$ $r'$ form with the said pattern piece $o$, an empty space which is rammed full of sand, and forms the core $m$ situated between two vanes. Then the lever $k$ is brought into the position shown in full lines in Fig. 1, and the patterns $r$ $r'$ moved apart, so that the core $m$ just made, is uncovered, whereupon the arm $c$ is turned to such an extent that the index $n$ points to the next division line $s^2$, whereupon a vane $p$ is placed on the core piece $m$ just rammed, and by bringing the lever $k$ into the broken line position shown in Fig. 1, the wood blocks $r$ are again brought nearer together, so that they surround the vane $p$ with their recesses $u$ $u'$ and form round it an empty space which again is rammed with molding sand. The blocks are again moved apart, the arm $c$ is advanced to the extent of one division, the next vane put on, and the blocks again moved towards each other. The space thus produced, is again rammed full of sand, and so on, until the core with the projecting pieces to be cast in, has reached the desired length. Then the outer casing mold is built round the said core carrying the vanes to be cast in, or the core is put into the said outer casing, so that the metal to be introduced flows round the ends of the vanes, and therefore the latter are embedded in the casting.

For manufacturing cores which are not circular it is, of course, merely necessary to guide the arm c in a different manner, and to make the pattern pieces r and t of a different shape inside.

Having now particularly described and ascertained the nature of this said invention and in what manner the same is to be performed, I declare that what I claim is:—

1. In a molding machine for forming successive cores between plates, vanes and the like to be cast in, a plurality of pattern pieces adjustable to and from each other, and progressively formed.

2. In a molding machine for forming a circle of successive cores between plates, vanes and the like to be cast in, a plurality of pattern pieces adjustable to and from each other in a radial direction, and progressively formed in the arc of a circle.

3. In a molding machine, the combination of a bed plate, a slide adjustable progressively and angularly thereof, jaws adjustably mounted on the slide, and pattern pieces carried by the jaws.

4. In a molding machine, the combination of a bed plate, a slide adjustable progressively and angularly thereof, jaws adjustably mounted on the slide, pattern pieces carried by the jaws, and a scale to gage the progressive movement of the slide over the bed plate.

5. In a molding machine, the combination of a bed plate, a slide adjustable progressively and angularly thereof, jaws adjustably mounted on the slide, and pattern pieces carried by the jaws, the pattern pieces provided on their opposed faces with means for receiving plates, vanes and the like to be cast in.

6. In a molding machine, the combination of a bed plate, a slide adjustable progressively and angularly thereof, jaws adjustably mounted on the slide, and pattern pieces carried by the jaws, the pattern pieces provided on their opposed faces with means for receiving plates, vanes and the like to be cast in, and a scale with graduations spaced apart a distance equal to the face of the pattern pieces plus the thickness of the inserted plate, vane and the like.

7. In a molding machine, the combination of a bed plate, a slide adjustable progressively and angularly thereof, jaws adjustably mounted on the slide, racks fixed to the jaws, a pinion engaging the racks to adjust the jaws to and from each other, and pattern pieces carried by the jaws.

8. In a molding machine, the combination of a circular bed plate, a central standard, an arm carried thereby and revoluble thereabout, a slide radially adjustable on the arm, jaws mounted on the slide, means to adjust the jaws to and from each other, and pattern pieces carried by the jaws.

9. In a molding machine, the combination of a circular bed plate, a central standard, an arm carried thereby and revoluble thereabout, a slide radially adjustable on the arm, jaws mounted on the slide, means to adjust the jaws to and from each other, pattern pieces carried by the jaws, and a scale with radial graduations to gage the progressive revolution of the arm to form successive cores of a predetermined size.

10. In a molding machine, the combination of a circular bed plate, a central standard, an arm carried thereby and revoluble thereabout, a slide radially adjustable on the arm, jaws mounted on the slide, means to adjust the jaws to and from each other, pattern pieces carried by the jaws, the pattern pieces provided on their opposed faces with means to receive plates, vanes and the like to be cast in between successive cores, and a scale with radial graduations spaced apart equal to the face of the pattern pieces plus the thickness of the inserted plate and the like.

In testimony whereof I have signed my name to this specification in the presence of two subscribing witnesses.

GOTTLIEB DUNKEL.

Witnesses:
THEODOR WEICHOLD,
MARTHA MÜHLISCH.